Figure 1:
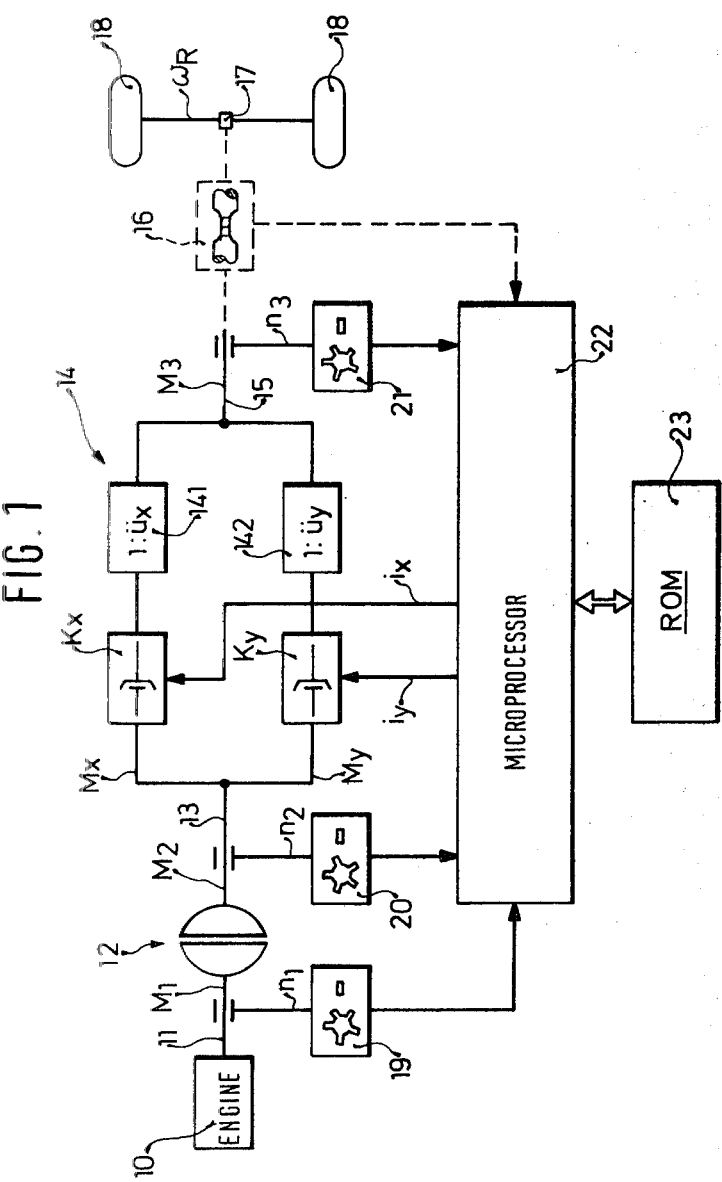

United States Patent [19]

Grob et al.

[11] 4,231,092

[45] Oct. 28, 1980

[54] METHOD AND SYSTEM FOR ELECTRONIC SIMULATION OF A FREEWHEEL

[75] Inventors: Ferdinand Grob, Besigheim; Friedrich Rabus, Schwieberdingen, both of Fed. Rep. of Germany

[73] Assignee: Robert Bosch GmbH, Stuttgart, Fed. Rep. of Germany

[21] Appl. No.: 966,355

[22] Filed: Dec. 4, 1978

[30] Foreign Application Priority Data

Dec. 10, 1977 [DE] Fed. Rep. of Germany ....... 2755201

[51] Int. Cl.³ .................... G06F 15/20; G05G 15/08
[52] U.S. Cl. ........................................ 364/431; 74/866; 364/578
[58] Field of Search ...................... 364/431, 578, 805; 74/861, 862, 857, 845, 866, 868; 318/9

[56] References Cited

U.S. PATENT DOCUMENTS

| | | | |
|---|---|---|---|
| 3,013,442 | 12/1961 | Fox et al. | 74/857 |
| 3,913,419 | 10/1975 | Sale et al. | 74/857 |
| 3,937,105 | 2/1976 | Arai et al. | 74/866 |
| 3,942,393 | 3/1976 | Förster et al. | 74/862 |
| 4,107,776 | 8/1978 | Beale | 364/431 |

*Primary Examiner*—Errol A. Krass
*Attorney, Agent, or Firm*—Frishauf, Holtz, Goodman & Woodward

[57] ABSTRACT

To simulate freewheel operation, that is to allow torque transmission in one direction only, the variation with respect to time of the torque transmitted by a friction coupling clutch or brake band) is computed and the coupling is released when the transmitted torque passes through zero. When the coupling is slipping, the time at which the torque passed through zero is taken to be the time at which the input and output speed of the coupling are the same. When a slipping and a fully engaged coupling are connected in parallel, the torque transmitted by the fully engaged coupling is computed from a set of equations utilizing only parameters sensed in any case in a standard drive system. Speed sensors and a torsiometer furnish signals required for the computations. Preferably, the computations are implemented by a microprocessor.

15 Claims, 4 Drawing Figures

METHOD AND SYSTEM FOR ELECTRONIC SIMULATION OF A FREEWHEEL

The present invention relates to automatic transmissions and in particular to automatic transmissions wherein friction coupling means are provided for transmitting torque from either the engine or a torque converter to the differential and the wheels. In particular, this invention relates to automatic transmissions wherein engine braking, that is transmission of torque in the direction from the wheels to the engine, is to be prevented.

BACKGROUND AND PRIOR ART

Automatic transmissions operative in a plurality of gear ratios are known in which at a particular gear ratio it is desired to transmit torque in one direction only. For example, when the lowest gear is engaged, engine braking is prevented in some known transmissions since this would cause a jolt if the driver removed his foot from the gas pedal. The freewheel operation improves the quality of the gear shift for particular types of transmissions and increases the driving comfort.

It is a disadvantage of the known freewheel transmissions that the cost of the transmissions is greatly increased.

THE INVENTION

It is an object of the present invention to furnish an automatic transmission which does not have a mechanical freewheel but wherein the freewheel operation is simulated electronically. The cost of the equipment is to be reduced substantially thereby.

In the automatic transmissions in accordance with the present invention the torque transmitted by a friction coupling means is continuously computed and a "release" signal is furnished when the torque is substantially equal to zero. The friction coupling means is released in response to the "release" signal.

In preferred embodiments, the computation of the torque transmitted by the friction coupling means requires only the sensing of parameters which are normally sensed in any case in a motor vehicle having an automatic transmission.

DRAWING ILLUSTRATING A PREFERRED EMBODIMENT

Figure 2:
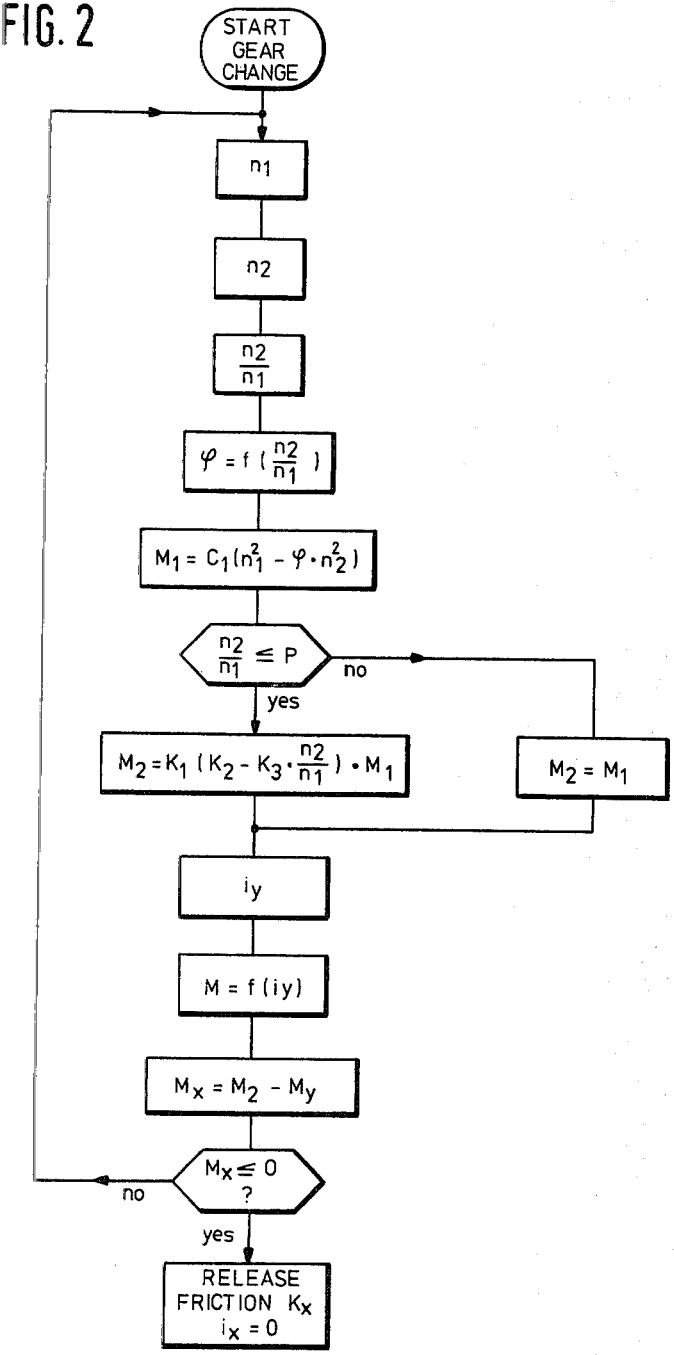
Figures 3A, 3B:
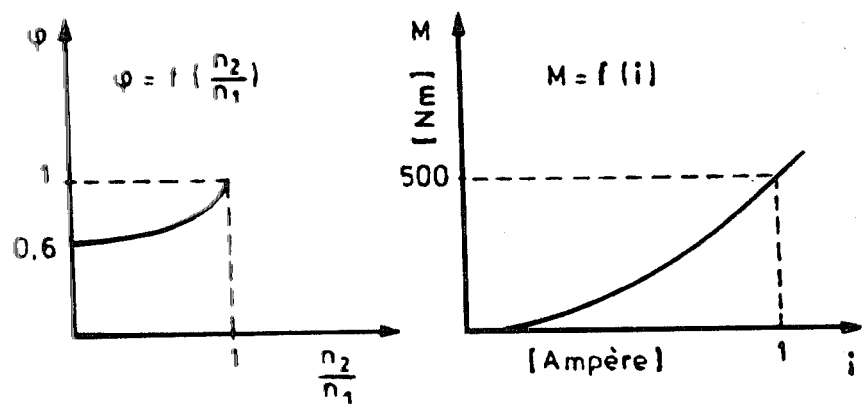

FIG. 1 is a schematic diagram illustrating a system in accordance with the present invention; and FIG. 2 shows a flow chart for the microprocessor of FIG. 1, FIGS. 3A and 3B show the transfer characteristic of a torque conver and friction element, respectively.

In order to simulate the operation of a freewheel electronically, it is necessary to determine the torque in the friction elements of the transmission, for example in the clutches or in the brake bands, continually and to release the corresponding friction element when the torque transmitted thereby passes through zero. The difficulty in solving this problem lies in the fact that the torque transmitted by a fully engaged friction element during gear shift cannot be measured because another friction element is slipping at the same time. To use additional measurement instruments to measure the torque transmitted by a friction element would increase the cost of the automatic transmission to such an extent that the economical advantages of the electronic simulation would be nullified. The method and system in accordance with the present invention thus utilize only operating parameters of the drive system which can be easily sensed and which are, in general, present in the motor vehicle in any case. The operating parameters concerned are the input and output speeds $n_1$, $n_2$ of the hydraulic torque converter which precedes the automatic transmission and the output speed $n_3$ of the automatic transmission. Further, it is assumed that the torque transmitted by a slipping friction element can be determined from its control current.

In FIG. 1, an engine 10 is coupled to an output shaft 11 which also constitutes the input shaft of a torque converter 12. The output shaft 13 of torque converter 12 is connected to an automatic transmission 14. The output shaft of automatic transmission 15 is connected to the driven portion, namely a differential 17 and wheels 18, possibly through a torsiometer 16. A speed sensor 19 senses the speed of shaft 11. Speed sensors 20 and 21 respectively sense the rotary speeds of shafts 13 and 15. The outputs of speed sensors 19, 20, and 21, as well as the output of torsiometer 16 if present, are connected to inputs of a computer 22 which, in a preferred embodiment, is a microprocessor. The microprocessor also includes a read only memory 23. Further, computer stage 22 furnishes control signals for friction elements $K_x$, $k_y$ of automatic transmission 14. Gear ratios $1:u_x$ and $1:u_y$ are associated with friction elements $K_x$ and $K_y$, respectively. The gear stages are designated by reference numerals 141 and 142 respectively.

Input shaft 11 transmits a torque $M_1$ at a speed $n_1$; output shaft 13 of torque converter 12 transmits a torque $M_2$ at a rotary speed $n_2$. The torque $M_2$ is split into two partial torques $M_x$ and $M_y$ in automatic transmission 14. Torques $M_x$ and $M_y$ are transmitted by friction elements $k_x$ and $k_y$, respectively. The currents controlling friction elements $k_x$ and $k_y$ are denoted by $i_x$ and $i_y$ respectively. Finally, output shaft 15 of automatic transmission 14 transmits an output torque $M_3$ at a rotary speed $n_3$, causing wheels 18 of the motor vehicle to have an angular velocity $\omega_R$.

According to the invention, the electronic simulation of a freewheel operation is carried out by first determining the variation with respect to time of the torques $M_x$ and $M_y$ transmitted by the friction elements and then releasing the respective friction elements at the moment at which the transmitted torque passes through zero.

For a slipping friction elements $K_x$, $K_y$, the time at which the transmitted torque passes through zero is determined by comparing the input and output speeds of the friction element to each other and furnishing a "release" signal when the two are equal. The input speed of friction elements $K_x$, $K_y$ is equal to $n_2$, the output speed is computed by measuring speed $n_3$ and adjusting it by the respective gear ratios $u_x$, $u_y$.

When one of the friction elements is slipping while the other is fully engaged, it is difficult to determine the torque transmitted by the engaged element as a function of time, since no corresponding measuring apparatus is normally present in automatic transmission 14. It is, however, in accordance with the present invention, possible to determine the torque transmitted in the fully engaged friction element from other available operating parameters. The following equation holds for the output torque $M_2$ of hydraulic torque converter 12:

$$M_2 = M_x + M_y.$$

The output torque $M_3$ is given by the equation:

$$M_3 = M_x u_x + M_y u_y.$$

Since the ratios $u_x$ and $u_y$ are known, the torque transmitted by the fully engaged friction element can be determined if two of the three torques $M_2$, $M_3$ and the torque transmitted by the slipping friction element are known.

The torque transmitted by the slipping friction element can be computed in a very simple fashion from the control current i and the characteristic curve of the friction element, that is the curve of $M = f(i)$, shown in FIG. 3B. The output torque of torque converter 12, namely torque $M_2$, can be determined from the converter input and output speeds $n_1$, $n_2$. First, the input torque $M_1$ is computed according to the equation:

$$M_1 = C_1(n_1^2 - \phi n_2^2)$$

where C1 is a constant and $\phi = f(n_2/n_1)$ is a characteristic function of the torque converter (FIG. 3A). Once the input torque $M_1$ is known, the output torque $M_2$ in a first region $$0 \leq n_2/n_1 \leq p$$

(where P is a fraction less than 1 whose exact value depends upon the particular system) can be determined in accordance with the relationship:

$$M_2 = K_1(K_2 - K_{3n2/n1})M_1$$

In a second speed region $$p \leq n_2/n_1 \leq 1.0$$

the output torque $M_2$ is computed according to the relationship:

$$M_2 = M_1.$$

It is particularly advantageous to store the characteristic curves such as the characteristic curve of the torque converter mentioned above and the torque transmission characteristic curves of the friction elements in a storage means which, preferably, is a read only memory.

The output torque $M_3$ can be determined by means of torsiometer 16. A measuring instrument suitable for use as such a torsiometer is described in German DE-OS 2727556. Such a torsiometer converts torque $M_3$ into a mechanical rotation and thence into an electrical signal.

A further possibility to determine torque $M_3$ is to first calculate torque $M_3$ from torque $M_2$ and the applicable gear ratio at the moment at which the gear shift is initiated. This can be done because at the time the gear shift is initiated only one of the clutches transmits torque. The road resistance $R_W$ relative to wheels 18 at the beginning of a gear shift then is calculated according to the equation:

$$R_w = M_3(t=0) - \Theta_F \dot{\omega}_R$$

where $\Theta_F$ is the moment of inertia of the vehicle relative to wheels 18 while $\dot{\omega}_R$ is the first derivative with respect to time of the circumferential velocity of wheels 18. The latter can of course be determined simply from the rotational velocity $n_3$. It is then assumed that the road resistance $R_w$ of the vehicle relative to wheels 18 does not change in the short period of time involved in the gear shift (approximately one-half second). With this assumption, the torque $M_3$ during gear shift can be derived for changing $\dot{\omega}_R$ from the equation:

$$M_3 = R_w + \Theta_F \dot{\omega}_R$$

The required computations in accordance with the above equations are carried out by microprocessor 22 operating in conjunction with read only memory 23. As mentioned above, the computer stage or microprocessor 22 furnishes the release signals which cause friction elements $K_x$, $K_y$ to be disengaged when the torque transmitted by them passes through zero.

The following values apply for a preferred embodiment:

$u_x = 1,478$
$u_y = 1$
$C1 = 4 \cdot 10^{-5}$ Nm min$^2$
Phi $= f(n_2/n_1)$
$p = 0.88$
$\Theta_F = 12.64$ Nm s$^2$
$K_1 = 1$
$K_2 = 2$
$K_3 = 1,136$ The flow chart for microprocessor 22, which describes the program stored in storage means 23 in addition to the various characteristic curves is shown on FIG. 2. It is self-explanatory.

Various changes and modifications may be made within the scope of the inventive concept.

We claim:

1. In the drive system having an engine, driven members, and an automatic transmission having controllable friction coupling means for transmitting torque from said engine to said driven members, a method for simulating freewheel operation, comprising the steps of computing said torque transmitted by said friction coupling means and furnishing a "release" signal when the so-computed torque is equal to zero; and releasing said friction coupling means in response to said "release" signal.

2. In a drive system having an engine, driven members and an automatic transmission having controllable friction coupling means ($K_x$, $K_y$) coupled between said engine and said driven members, a method for simulating freewheel operation, comprising the steps of furnishing a "release" signal when the torque transmitted by said friction coupling means is equal to zero independently of engine speed; and releasing said friction coupling means in response to said "release" signal, whereby transmission of torque from said driven members to said engine is prevented.

3. A method as set forth in claim 1, wherein said friction coupling means has an input speed and an output speed unequal to said input speed when said friction coupling means is slipping; and wherein said step of furnishing said release signal when the torque transmitted by said friction coupling means is equal to zero comprises the step of furnishing said "release" signal when said input speed is equal to said output speed.

4. A method as set forth in claim 1, wherein said step of furnishing said "release" signal comprises the step of computing said torque transmitted by said friction coupling means and furnishing said "release" signal when the so-computed torque is equal to zero.

5. A method as set forth in claim 4, wherein said automatic transmission comprises first and second friction coupling means ($K_X$, $K_Y$) connected in parallel and having an associated first and second gear ratio respectively, wherein the so-connected first and second friction coupling means receive a transmission input torque ($M_2$) and furnish a transmission output torque ($M_3$); wherein said first friction coupling means is fully engaged and said second friction coupling means is slipping and transmitting a torque $M_Y$; and wherein said step of computing said torque transmitted by said friction coupling means comprises the step of computing the torque ($M_X$) transmitted by said first friction coupling means in accordance with the equations:

$$M_2 = M_x + M_y$$

$$M_3 = M_x u_x + M_y u_y$$

where $u_x$ and $u_y$ are, respectively, said first and second gear ratios.

6. A method as set forth in claim 5, wherein said drive system further comprises torque converter means (12) having a torque converter output connected to said input of said automatic transmission; wherein said torque converter means has an input speed $n_1$ and an output speed $n_2$; and wherein said step of computing said torque transmitted by said first friction coupling means comprises the step of computing said transmission input torque ($M_2$) from said input and said output speed of said torque converter means.

7. A method as set forth in claim 6, wherein a torque converter input torque $M_1$ is applied to said torque converter means; and wherein said step of computing said transmission input torque ($M_2$) comprises the step of first computing said torque converter input torque ($M_1$) in accordance with the equation:

$$M_1 = C_1(n_1^2 - \phi n_2^2)$$

where
$C_1$ is a constant; and
$\phi$ is a function of the speed ratio ($n_2/n_1$) of said torque converter means; and
wherein said transmission input torque ($M_2$) is computed according to the equation:

$$M_2 = K_1(K_2 - K_3 n_2/n_1)M_1$$

for a first region defined by:

$$0 \leq n_2/n_1 \leq p,$$

where p is a system-determined proper fraction and said transmission input torque ($M_2$) is computed according to the relationship $$M_2 = M_1$$

for a second region defined by:

$$p \leq n_2/n_1 \leq 1.0$$

8. A method as set forth in claim 5, wherein said step of computing said torque transmitted by said first friction coupling means comprises first computing said torque transmitted by said second friction coupling means; wherein said torque ($M_y$) transmitted by said second friction coupling means is a function of controlled current ($i_y$) applied to said friction coupling means; and wherein said step of computing said torque transmitted by said second friction coupling means comprises the step of furnishing a controlled current signal corresponding to said controlled current applied to said second friction coupling means and computing said torque transmitted by said second friction coupling means as a function thereof.

9. A method as set forth in claim 5, wherein said step of computing said torque transmitted by said first friction coupling means comprises the step of measuring said transmission output torque ($M_3$) and furnishing a corresponding transmission output torque measuring signal, and computing said torque ($M_x$) transmitted by said first friction coupling means as a function of said transmission output torque measurement signal.

10. A method as set forth in claim 5, wherein said first friction coupling means ($K_x$) is fully engaged at the start of a gear shift operation; wherein a controlled current substantially equal to zero is applied to said second friction coupling means ($K_y$) at said start of said gear shift operation; and wherein said step of computing said torque transmitted by said first friction coupling means during said gear shift operation comprises the step of first computing said transmission output torque ($M_3$) according to the equation:

$$M_{3(t=o)} = M_2 u_x$$

wherein said automatic transmission is located in a vehicle having wheels; wherein said step of computing said torque transmitted by said first friction coupling means during said gear shift operation further comprises the step of computing the road resistance ($R_2$) of said vehicle relative to said wheels (18) in accordance with the equation:

$$R_2 = M_{3(t=o)} - \textcircled{H}_F \dot{\omega}_R$$

where $\textcircled{H}_F$ is the moment of inertia of said vehicle relative to said wheels and $\dot{\omega}_R$ is the first derivative with respect to time of the circumferential velocity of said wheels; and computing said transmission output torque ($M_3$) during said gear shift operation in accordance with the equation:

$$M_3 = R_2 + \textcircled{H}_F \dot{\omega}_R$$

11. In a motor vehicle having wheels (18), an engine (10), and automatic transmission means (14) interconnected between said engine and said wheels for receiving a transmission input torque ($M_2$) from said engine and furnishing a transmission output torque ($M_3$) to said wheels, said automatic transmission means having friction coupling means operative in response to controlled current applied thereto and having an associated gear ratio, a system for simulating freewheel operation, comprising computing means (22, 23) connected to said friction coupling means and said engine, for computing the torque transmitted by said friction coupling means and for furnishing a controlled current releasing said friction coupling when the so-computed torque is equal to zero, independently of engine speed, whereby transmission of torque from said wheels to said engine is prevented.

12. A system as set forth in claim 11, wherein said friction coupling means is operative in a slippage phase; further comprising first and second speed sensor means (20, 21) for, respectively, sensing the input speed and the output speed of said friction coupling means and furnishing a first and second speed signal corresponding thereto; and wherein said computing means comprises means for furnishing said controlled current for releasing said friction coupling means when said first and said second speed signals have a predetermined relationship relative to one another.

13. A system as set forth in claim 12, wherein said predetermined relationship between said first and second speed signal is equality.

14. A system as set forth in claim 11, wherein said friction coupling means comprises a first and second friction coupling having, respectively, a first and second gear ratio associated therewith and transmitting, respectively, a first and second torque; wherein said torque transmitted by said second friction coupling is a function of control current ($i_y$) applied thereto; and wherein said computing means further comprises storage means (23) for storing the characteristic curve $M_y = f(i_y)$.

15. A system as set forth in claim 14, wherein said storage means is a read only memory.

* * * * *